United States Patent [19]
Brown et al.

[11] Patent Number: 5,931,770
[45] Date of Patent: Aug. 3, 1999

[54] CONTROLLED DEFLECTION ROLL BEARING PAD

[75] Inventors: Dale A. Brown, Milton, Wis.; Gerald J. Kramer, Rockton, Ill.

[73] Assignee: Beloit Technologies, Inc., Wilmington, Del.

[21] Appl. No.: 08/911,228

[22] Filed: Aug. 15, 1997

[51] Int. Cl.$^6$ .................................................. B23P 15/00
[52] U.S. Cl. .................................. 492/7; 492/16; 492/20
[58] Field of Search ..................................... 492/7, 20, 16

[56] References Cited

U.S. PATENT DOCUMENTS

| | | | |
|---|---|---|---|
| 4,228,571 | 10/1980 | Biondetti | 29/116 |
| 4,262,401 | 4/1981 | Miesch | 29/116 |
| 4,825,520 | 5/1989 | Alajoutsijärvi et al. | 29/116.1 |
| 4,916,748 | 4/1990 | Schrörs | 384/99 |
| 5,060,357 | 10/1991 | Roerig et al. | 29/113.2 |
| 5,127,141 | 7/1992 | Roerig et al. | 29/116.2 |
| 5,509,883 | 4/1996 | Niskanen et al. | 492/20 |
| 5,782,729 | 7/1998 | Vestola | 492/20 |
| 5,788,619 | 8/1998 | Brown et al. | 492/20 |

*Primary Examiner*—Irene Cuda
*Attorney, Agent, or Firm*—Michael Best & Friedrich LLP

[57] ABSTRACT

A controlled deflection roll for a papermaking machine. The roll includes a roll shaft having a longitudinal axis, a roll shell surrounding the shaft, and a bearing pad assembly supported on the shaft to supportingly engage the shell and move the shell translationally relative to the shaft in a plane including the axis. In one embodiment, the bearing pad assembly includes a plurality of bearing pads. Each bearing pad is spaced apart in the cross-machine direction and has a contact surface engageable with the inner surface of the shell. The contact surface is in the shape of a parallelogram and defines therein at least one recess. The side edges of adjacent bearing pads are straight and parallel to each other and define gaps therebetween. The gaps do not extend along a plane which is perpendicular to the axis. In another embodiment, the bearing pad assembly includes at least one bearing pad having a contact surface and opposite edges. The contact surface has a contact surface portion engageable with the shell. The contact surface portion has a plurality of continuous contact surface portions extending between the opposite edges such that each of said continuous contact surface portions does not extend in a plane which is perpendicular to said axis. The roll further includes a hydraulic assembly independently actuating the plurality of bearing pads to selectively engage the shell and supplying lubricant between the support surfaces and the shell. A pressure profile and a temperature profile are created along the length of the shell. The bearing pads engage the shell such that the pressure profile and the temperature profile are substantially evenly distributed along the length of said shell.

22 Claims, 3 Drawing Sheets

CONTROLLED DEFLECTION ROLL BEARING PAD

BACKGROUND OF THE INVENTION

This invention relates to a controlled deflection roll such as is used in the press and calender sections of a papermaking machine. More particularly, this invention relates to a hydrostatic bearing pad for a controlled deflection roll.

As partially illustrated in FIGS. 5 and 6, a typical controlled deflection roll 110 includes a roll shaft 114 having a longitudinal axis 118 extending in the cross-machine direction. A roll shell 122 surrounds the shaft 114. The shell 122 engages another roll (not shown) to apply a nip pressure. One or more bearing pads 154 support the inner surface of the shell 122 relative to the shaft 114. Hydraulic fluid flows between the contact surface 158 of each bearing pad 154 and the inner surface of the shell 122. The side edges 164 of each contact surface 158 extend along planes perpendicular to the axis 118 of the shaft 114. A physical gap $G_{PA}$ (only two identified in FIG. 5) is defined between the side edges 164 of adjacent bearing pads 154, and the gaps $G_{PA}$ extend along planes perpendicular to the axis 118 of the shaft 114. Similarly, the contact surface 158 of each bearing pad 154 includes a plurality of continuous contact surface portions 174 (identified in FIGS. 5 and 6 for the left bearing pad 154 only) which extend the full length of the bearing pad 154 (from top to bottom in FIG. 5) and which extend perpendicular to the axis 118.

SUMMARY OF THE INVENTION

In a controlled deflection roll, changes in the temperature across the length of the roll shell adversely affect the nip pressure profile applied by the roll shell. Similarly, changes or variations in the pressure profile across the length of the roll shell adversely affect the nip pressure profile.

One of the problems with the above-identified prior art bearing pad assembly 150 is that, along the physical gaps $G_{PA}$ between adjacent bearing pads 154, the flow of hydraulic fluid is reduced or non-existent. This reduced fluid flow creates a variation in the temperature of the roll shell 122, or temperature gap, $T_{PA}$ (only one shown in FIGS. 5 and 6) at the point of reduced fluid flow. In addition, fluid shear on the contact surface 158 of each bearing pad 154 creates heat, resulting in a similar temperature gap $T_{PA}$ on the continuous contact surface portions 174 of each contact surface 158 (shown in FIGS. 5 and 6 for the left bearing pad 154 only). Another problem is that a pressure variation, or pressure gap, $P_{PA}$ (only one shown in FIGS. 5 and 6) exists around the physical gap between adjacent bearing pads 154.

Because the gaps $G_{PA}$ between adjacent rectangular bearing pads 154 extend along planes which are perpendicular to the axis 118 of the roll shaft 114, and because the continuous contact surface portions 174 of the contact surfaces 158 also extend along planes which are perpendicular to the axis 118 of the roll shaft 114, the corresponding temperature gaps $T_{PA}$ and pressure gaps $P_{PA}$ also extend along planes which are perpendicular to the axis 118 of the roll shaft 114. The temperature gaps $T_{PA}$ and pressure gaps $P_{PA}$ produce corresponding variations in the temperature and pressure profiles on the surface of the roll shell 122. Therefore, the nip pressure profile is adversely affected by this prior art bearing pad assembly 150.

This disadvantage of the prior art can be better understood with reference to FIGS. 5 and 6. As the shell 122 rotates, certain points on the surface of the shell 122 are always in a temperature gap $T_{PA}$ and a pressure gap $P_{PA}$ as those points move across the bearing pads 154. Viewed from the perspective of the shell 122, and considering a line on the shell 122 parallel to the axis 118, the temperature gaps $T_{PA}$ and the pressure gaps $P_{PA}$ are stationary on that line as that line passes over the bearing pads 154. As a result, in the prior art, the temperature profile and the pressure profile are not evenly distributed along the outer surface of the shell 122.

The present invention provides an improved controlled deflection roll which overcomes the limitations of earlier controlled deflection rolls. The controlled deflection roll of the present invention provides substantially evenly distributed pressure and temperature profiles along the length of the roll shell, thus reducing the adverse affect to the nip pressure profile applied by the controlled deflection roll.

More particularly, the invention provides a controlled deflection roll for a papermaking machine, the roll comprising a roll shaft having a longitudinal axis in the cross-machine direction, a roll shell surrounding the shaft and having an inner surface, and a bearing pad assembly supported on the shaft to supportingly engage the inner surface of the shell. The bearing pad assembly also moves the shell translationally relative to the shaft in a plane including the axis. The bearing pad assembly includes at least a first bearing pad and a second bearing pad spaced apart in the cross-machine direction. The first and second bearing pads have respective contact surfaces having respective side edges defining therebetween a gap. The gap between the side edges of the first and second bearing pads does not extend along a plane which is perpendicular to the roll shaft axis.

In one embodiment, each contact surface is in the shape of a parallelogram. Further, the side edges are preferably straight and parallel to each other. Preferably, the controlled deflection roll further comprises a hydraulic assembly independently actuating the bearing pads to selectively engage the inner surface of the shell. The hydraulic assembly preferably supplies lubricant or hydraulic fluid between the contact surface of each bearing pad and the inner surface of the shell.

The invention also provides a controlled deflection roll comprising a roll shaft, a roll shell, and a bearing pad assembly. The bearing pad assembly includes at least one bearing pad having a contact surface engageable with the inner surface of the shell. The contact surface has opposite edges spaced apart in the direction of rotation of the roll shell relative to the roll shaft. The contact surface has a plurality of continuous contact surface portions extending between the opposite edges such that each of the continuous contact surface portions does not extend along a plane which is perpendicular to the axis.

In one embodiment, the contact surface is in the shape of a parallelogram. Also, each continuous contact surface portion is preferably in the shape of a parallelogram. In addition, the continuous contact surface portions preferably extend in planes which are non-perpendicular to the axis.

Other features and advantageous of the invention will become apparent to those skilled in the art upon review of the following detailed description, claims and drawings.

Figure 1:
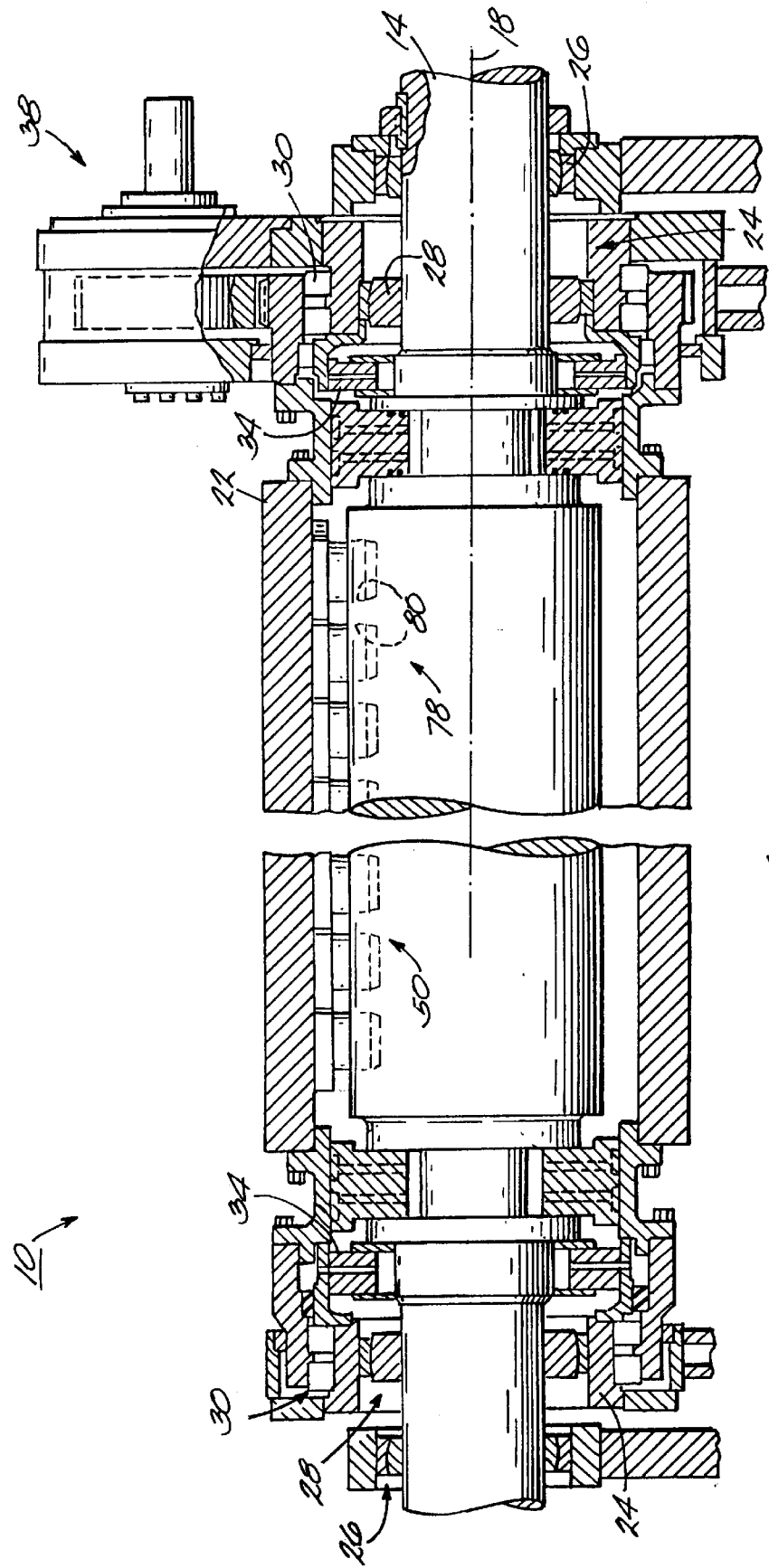
FIG. 1 is a partial side elevational and cross-sectional view of a controlled deflection roll embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

A controlled deflection roll 10 embodying the invention is partially illustrated in FIG. 1. The controlled deflection roll 10 is part of a papermaking machine (not otherwise shown) having a machine direction (into and out of the paper in FIG. 1) and a cross-machine direction (right to left in FIG. 1). The controlled deflection roll 10 includes a center stationary support shaft 14 having a longitudinal axis 18 extending in the cross-machine direction. The controlled deflection roll 10 also includes a hollow cylindrical roll shell 22 surrounding the roll shaft 14.

Figure 4:
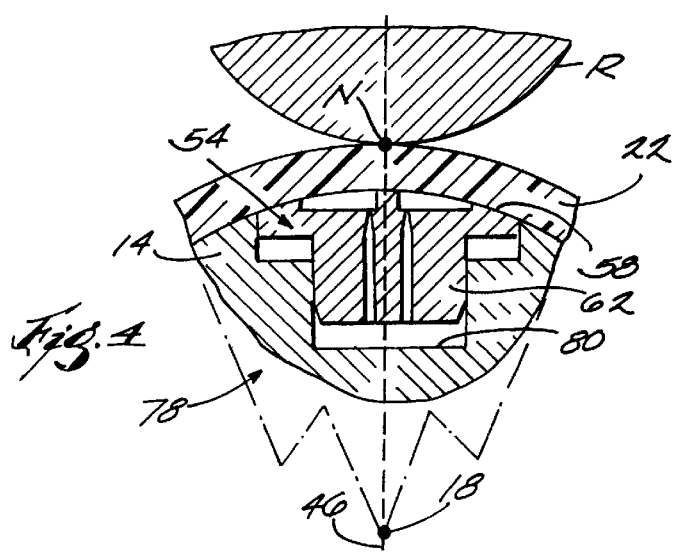
FIG. 4 is a partial longitudinal cross-sectional view of a portion of the bearing pad assembly along line 4—4 in FIG. 3.

In order to bring the controlled deflection roll 10 into contact or nipping engagement with another roll R (as illustrated in FIG. 4) to apply a nip load, the controlled deflection roll 10 can be either self-loading or non-self loading. In a self-loading controlled deflection roll, the roll shell is translationally movable relative to the roll shaft. In a non-self loading controlled deflection roll, the roll shell and roll shaft are radially fixed at their respective ends, and the entire controlled deflection roll is moved into contact with the other roll R by applying an external load to the ends of the roll shaft.

Due to the length of the controlled deflection roll 10 in the cross-machine direction, the roll shell 22 experiences some sag, or downward deflection, as a result of the weight of the roll shell 22 and the applied nip load. In both the self-loading and the non-self loading controlled deflection roll, a load is applied to the roll shell 22 to control this deflection, as explained more fully below.

In the illustrated construction, the controlled deflection roll 10 is a non-self loading controlled deflection roll. It should be understood, however, that the present invention also applies to self-loading controlled deflection rolls.

At each end, the roll shaft 14 supports a shell support member 24. While each shell support member 24 can be a bearing box, in the illustrated construction, the right (in FIG. 1) shell support member 24 is a gearbox, the purpose of which is explained below. Outboard bearing members 26 support the respective ends of the roll shaft 14. Inboard bearing members 28 are supported by the roll shaft 14 at each end of the roll shaft 14 and support the respective shell support members 24.

The roll shell 22 is supported by a bearing 30 at each axial end of the roll shell 22. The bearings 30 are mounted on the shell support member 24. The bearings 30 support the opposite ends of the roll shell 22 to allow rotation of the roll shell 22. A seal 34 is located at each end of the shaft 14 axially inwardly of the inboard bearing members 28. The roll shell 22 is rotatably driven by a drive mechanism 38 at the right end (in FIG. 1) of the roll shell 22, and the shell support member 24 is the gearbox of the drive mechanism 38. In other constructions, however, the roll shell 22 may be non-driven.

As shown in FIG. 4, the roll shell 22 is in nipping engagement with the other roll R along a nip line of contact N in a nip plane 46. The nip plane 46 includes the nip line of contact N and the axis 18 of the roll shaft 14.

The controlled deflection roll 10 also includes (see FIG. 1) a hydrostatic bearing pad assembly 50. The bearing pad assembly 50 is supported on the roll shaft 14 and supportingly engages the inner surface of the roll shell 22. The bearing pad assembly 50 moves the roll shell 22 translationally relative to the roll shaft 14 in the nip plane 46 to control and correct the deflection of the roll shell 22. (In a self-loading controlled deflection roll, on the other hand, the bearing pad assembly moves the roll shell translationally relative to the roll shaft in the nip plane to move the roll shell into contact with the other roll and also to control and correct the deflection of the roll shell.)

Figure 2:
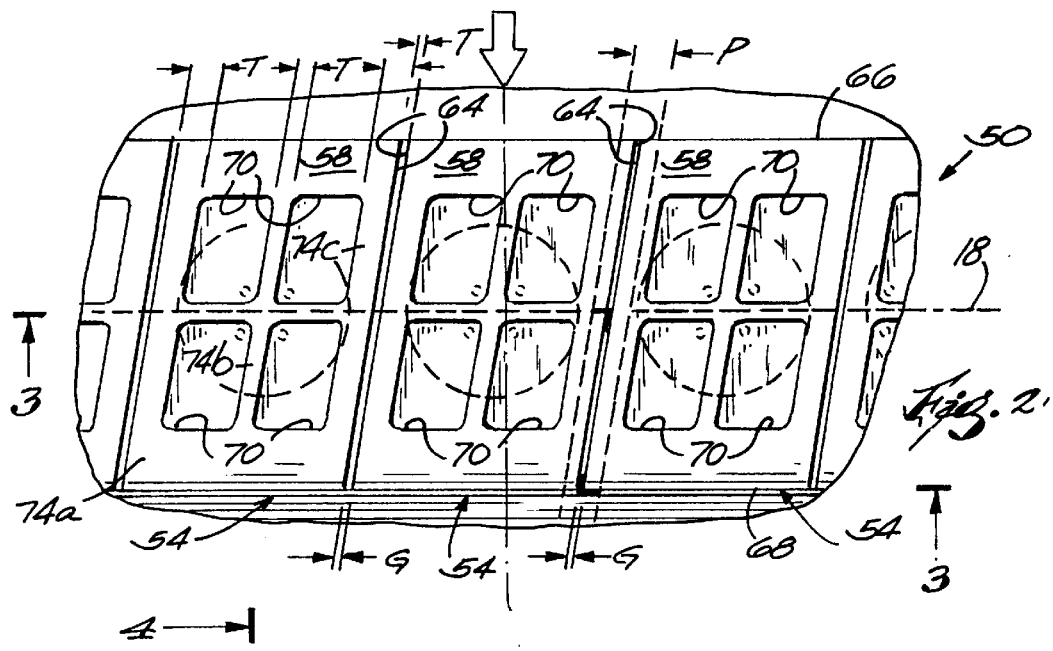
FIG. 2 is a top view of an enlarged portion of the controlled deflection roll shown in FIG. 1 and shows a portion of the bearing pad assembly.

As shown in FIG. 2, the bearing pad assembly 50 includes at least one bearing pad 54. In the illustrated construction, the bearing pad assembly 50 includes a plurality of bearing pads 54 spaced apart in the cross-machine direction. Each bearing pad 54 includes a contact surface 58 complementary with and facing the inner surface of the roll shell 22. The contact surfaces 58 are engageable with the inner surface of the roll shell 22. Each pad 54 also includes a piston end 62 opposite the contact surface 58.

As shown in FIG. 2, each contact surface 58 is in the shape of a parallelogram and includes side edges 64 spaced in the direction of the axis 18 and opposite edges 66 and 68 spaced in the direction of rotation of the roll shell 22 relative to the roll shaft 14. Four cavities, recesses or recessed pockets 70 are formed in each contact surface 58. Each cavity 70 is in the shape of a parallelogram. Therefore, each contact surface 58 is, more specifically, in the shape of a parallelogram-shaped waffle.

Figure 5:
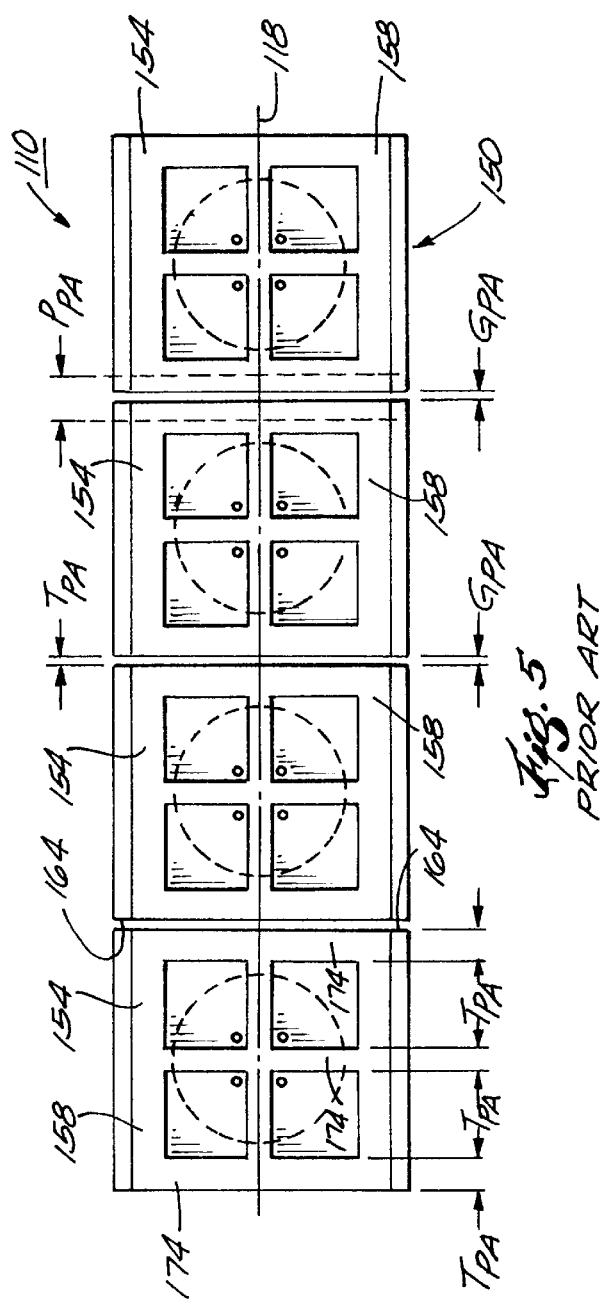
FIG. 5 is a top view of a portion of a prior art controlled deflection roll and shows a portion of a prior art bearing pad assembly.
Figure 6:
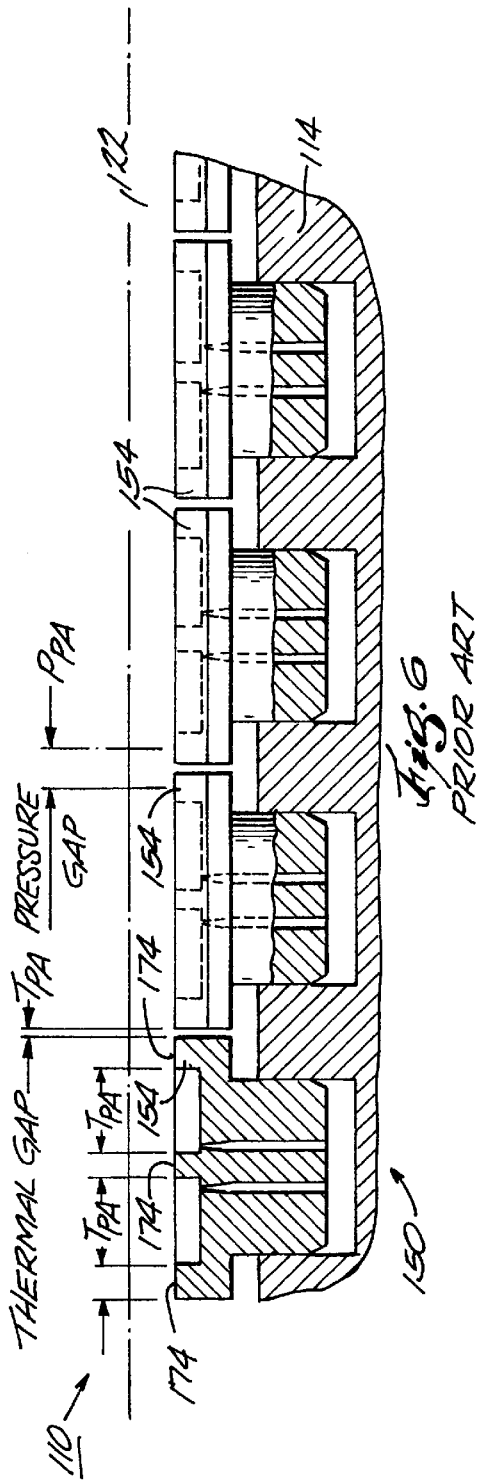
FIG. 6 is a partial side cross-sectional view along line 6—6 in FIG. 5.

Continuous contact surface portions 74 (identified in FIGS. 2 and 3 for the left bearing pad 54 only) extend the full length of the contact surface 58 (from top to bottom in FIG. 2) between the opposite edges 66 and 68. In the illustrated construction, each contact surface 58 includes an outer continuous contact surface portion 74a, a center continuous contact surface portion 74b, and an outer continuous contact surface portion 74c. The continuous contact surface portions 74a–c are spaced in the direction of the axis 18, and the adjacent continuous contact surface portions (74a and 74b, 74b and 74c) are separated by a pair of cavities 70 located therebetween. Each continuous contact surface portion 74 is also in the shape of a parallelogram. In addition, as compared to (see FIG. 5) the continuous contact surface portions 174 of the prior art bearing pad 154, each of the continuous contact surface portions 74 of the bearing pads 54 (see FIG. 2) does not extend in a plane which is perpendicular to the axis 18, the reason for which is explained below.

Figure 3:
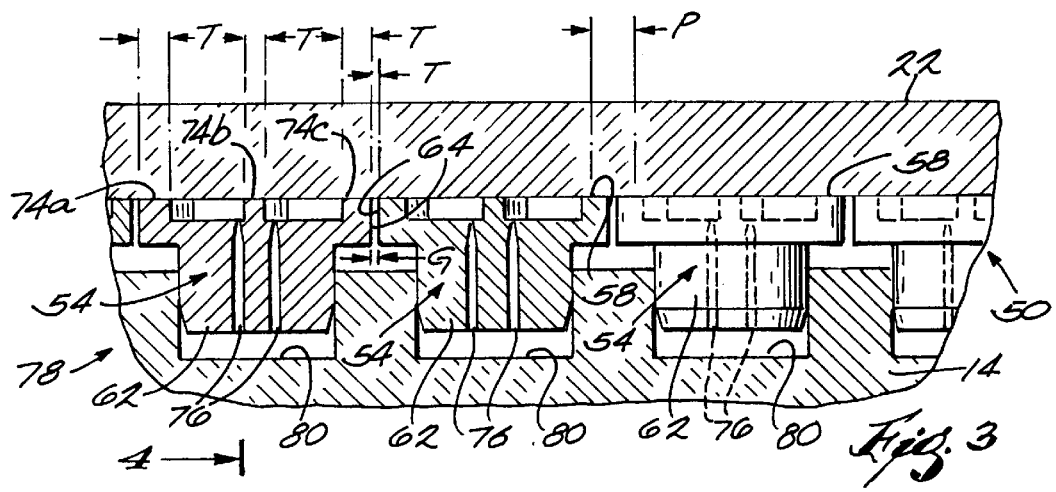
FIG. 3 is a partial side cross-sectional view of the bearing pad assembly along line 3—3 in FIG. 2.

As shown in FIGS. 3 and 4, throttling conduits 76 extend through each bearing pad 54 and connect the piston end 62 to the cavities 70. The purposes for the piston end 62, the cavities 70 and the throttling conduits 76 are explained in more detail below.

As shown in FIG. 2, physical gaps G (only two identified in FIG. 2) are defined between the side edges 64 of the contact surface 58 of adjacent bearing pads 54. In the preferred embodiment, the side edges 64 of adjacent bearing pads 54 are straight and parallel to each other. Additionally, the side edges 64 are located substantially in a plane which is non-perpendicular to the axis 18. As a result, each of the gaps G does not extend along a plane which is perpendicular to the axis 18. In other embodiments, the side edges 64 may be non-linear (e.g. curved or saw-tooth shaped) and may be non-parallel to each other as long as the gap G between adjacent bearing pads 54 does not extend substantially along a plane which is perpendicular to the axis 18.

The controlled deflection roll 10 also includes (see FIGS. 1 and 4) a hydraulic assembly 78 (partially shown). The hydraulic assembly 78 includes a hydraulic chamber or cylinder 80 corresponding to each bearing pad 54 in the bearing pad assembly 50. Each cylinder 80 is located on the roll shaft 14 and receives the piston end 62 of the corresponding bearing pad 54. A pump (not shown) located externally to the controlled deflection roll 10 supplies pressurized hydraulic fluid through conduits (not shown) extending through the roll shaft 14 to each cylinder 80. The hydraulic assembly 78 also includes fluid pressure, flow and temperature controls (not shown). The hydraulic assembly 78 controls the flow of hydraulic fluid to each cylinder 80 and bearing pad 54 combination independently. Each bearing pad 54 is thus independently actuated by the pressurized hydraulic fluid of the hydraulic assembly 78.

Additionally, the hydraulic assembly 78 supplies hydraulic fluid as a lubricant between the contact surface 58 of each bearing pad 54 and the inner surface of the roll shell 22. Hydraulic fluid is supplied by the hydraulic assembly 78 through the throttling conduits 76 to the cavities 70. The hydraulic fluid then flows between and lubricates the contact surfaces 58 and the inner surface of the roll shell 22.

In operation of the controlled deflection roll 10, the drive mechanism 38 drives the roll shell 22. The hydraulic assembly 78 actuates the bearing pad assembly 50 so that the bearing pads 54 apply a pressure to the roll shell 22. Movement of the inner surface of the roll shell 22 across the contact surface 58 of each bearing pad 54 creates friction and heats the hydraulic fluid flowing therebetween. Along the gap G between adjacent bearing pads 54, the flow of lubricating hydraulic fluid is reduced or non-existent. As shown in FIGS. 2 and 3, a variation in the temperature, or temperature gap T (only one shown in FIGS. 2 and 3), of the outer surface of the roll shell 22 is created in the vicinity of the gap G. Also, on the contact surface 58 of each bearing pad 54, fluid shear creates heat and creates a similar temperature gap T on each continuous contact surface portion 74 (shown in FIGS. 2 and 3 for the left bearing pad only). In addition, because the contact surface 58 has a larger surface area than the piston end 62, a pressure drop, or pressure gap P (only one shown in FIGS. 2 and 3), is created across the side edges 64 of adjacent bearing pads 54.

As described above and as shown in FIG. 2, the gaps G do not extend in planes which are perpendicular to the axis 18, and the gaps G are located substantially in planes which are non-perpendicular to the axis 18. As a result, the corresponding temperature gaps T and pressure gaps P also extend in planes which are non-perpendicular to the axis 18. Similarly, because the continuous contact surface portions 74 of each contact surface 58 are located in planes which are non-perpendicular to the axis 18, the corresponding temperature gaps T also extend in planes which are non-perpendicular to the axis 18.

As the roll shell 22 rotates, no points on the surface of the roll shell 22 are always in a temperature gap T or a pressure gap P as those points move across the bearing pads 54. Viewed from the perspective of the roll shell 22, and considering a line on the roll shell 22 parallel to the axis 18, the temperature gaps T and the pressure gaps P move back and forth on that line as that line passes over the bearing pads 54. The temperature profile and the pressure profile on the outer surface of the roll shell 22 are thus substantially evenly distributed along the length of the roll shell 22.

Various features of the invention are set forth in the following claims.

We claim:

1. A controlled deflection roll for a papermaking machine, the machine having a machine direction and a cross-machine direction, said roll comprising
    a roll shaft having a longitudinal axis in the cross-machine direction,
    a roll shell surrounding said shaft and having an inner surface, and
    a bearing pad assembly supported on said shaft to supportingly engage said inner surface of said shell and move said shell translationally relative to said shaft in a plane including said axis, said bearing pad assembly extending in the cross-machine direction, said bearing pad assembly including at least a first bearing pad and a second bearing pad, said first bearing pad and said second bearing pad being spaced apart in the cross-machine direction, said first bearing pad and said second bearing pad having respective contact surfaces engaging said inner surface of said shell, said contact surfaces having respective side edges, said side edges defining therebetween a gap that does not extend along a plane which is perpendicular to said axis.

2. A roll as set forth in claim 1 wherein each of said contact surfaces is in the shape of a parallelogram.

3. A roll as set forth in claim 1 wherein said side edges are substantially parallel to each other.

4. A roll as set forth in claim 1 wherein said side edges are straight.

5. A roll as set forth in claim 1 wherein each of said side edges is located substantially in a plane which is non-perpendicular said axis.

6. A roll as set forth in claim 1 wherein said gap extends substantially in a plane which is non-perpendicular to said axis.

7. A roll as set forth in claim 1 and further comprising a hydraulic assembly independently actuating each of said bearing pads to selectively engage said inner surface of said shell.

8. A roll as set forth in claim 1 wherein said roll shell is rotatable about said axis, wherein each of said contact surfaces has opposite edges spaced apart in the direction of rotation of said shell relative to said shaft, wherein each of said contact surfaces has a plurality of continuous contact surface portions extending between said opposite edges of said contact surface, and wherein each of said continuous contact portions is located substantially in a plane which is non-perpendicular to said axis.

9. A roll as set forth in claim 8 wherein each of said contact surfaces has therein at least one recess located between adjacent continuous contact surface portions.

10. A roll as set forth in claim 9 and further comprising a hydraulic assembly selectively supplying lubricant to said recesses, and wherein said lubricant flows between said contact surfaces and said inner surface of said shell.

11. A roll as set forth in claim 9 wherein each of said recesses is in the shape of a parallelogram.

12. A controlled deflection roll for a papermaking machine, the machine having a machine direction and a cross-machine direction, said roll comprising a roll shaft having a longitudinal axis in the cross-machine direction, a roll shell surrounding said shaft and rotatable about said axis, said shell having an inner surface, and a bearing pad assembly supported on said shaft to supportingly engage said inner surface of said shell and move said shell translationally relative to said shaft in a plane including said axis, said bearing pad assembly extending in the cross-machine direction, said bearing pad assembly including at least one bearing pad, said bearing pad having a contact surface, said contact surface having opposite edges spaced apart in the direction of rotation of said shell relative to said shaft, said contact surface having a plurality of continuous contact surface portions extending between said opposite edges of said contact surface such that each of said continuous contact surface portions does not extend along a plane which is perpendicular to said axis.

13. A roll as set forth in claim 12 wherein said contact surface is in the shape of a parallelogram.

14. A roll as set forth in claim 12 wherein said each of said continuous contact surface portions is in the shape of a parallelogram.

15. A roll as set forth in claim 12 wherein said contact surface defines therein at least one recess located between adjacent ones of said plurality of continuous contact surface portions.

16. A roll as set forth in claim 15 wherein said recess is in the shape of a parallelogram.

17. A roll as set forth in claim 15 and further comprising a hydraulic assembly selectively supplying lubricant to said recess, and wherein said lubricant flows between said contact surface and said inner surface of said shell.

18. A roll as set forth in claim 12 and further comprising a hydraulic assembly actuating said bearing pad to selectively engage said inner surface of said shell.

19. A controlled deflection roll for a papermaking machine, the machine having a machine direction and a cross-machine direction, said roll comprising a roll shaft having a longitudinal axis in the cross-machine direction, a roll shell surrounding said shaft and having an inner surface and a length in the cross-machine direction, and a bearing pad assembly supported on said shaft to supportingly engage said inner surface of said shell and move said shell translationally relative to said shaft in a plane including said axis, such that a pressure profile and a temperature profile are created along said length of said shell, said bearing pad assembly extending in the cross-machine direction, said bearing pad assembly including at least one bearing pad engaging said inner surface of said shell such that said pressure profile and said temperature profile are substantially evenly distributed along said length of said shell.

20. A roll as set forth in claim 19 wherein said bearing pad assembly includes a plurality of bearing pads, said bearing pads being spaced apart in the cross-machine direction such that gaps are defined between adjacent ones of said bearing pads, and wherein each of said gaps does not extend along a plane which is perpendicular to said axis.

21. A roll as set forth in claim 20 wherein each of said bearing pads is in the shape of a parallelogram.

22. A roll as set forth in claim 19 wherein said shell is rotatable about said axis, wherein said contact surface has opposite edges spaced apart in the direction of rotation of said shell relative to said shaft, wherein said contact surface has a plurality of continuous contact surface portions extending between said opposite edges, and wherein each of said continuous contact surface portions does not extend along a plane which is perpendicular to said axis.

\* \* \* \* \*